(12) United States Patent
Laban et al.

(10) Patent No.: US 6,935,678 B1
(45) Date of Patent: Aug. 30, 2005

(54) REINFORCED PAYLOAD CONTAINER

(75) Inventors: Christopher Scott Laban, Clinton, IL (US); Kristofor Lee Dahl, Homer Glen, IL (US); Terry Allen Coins, Decatur, IL (US); Edward Patrick Ormiston, Sullivan, IL (US); Clifford Eugene Miller, Clinton, IL (US); Christopher Charles Cusack, Decatur, IL (US); Timothy James Bromenshenkel, Decatur, IL (US); Thomas Edmund Fennell, Moweaqua, IL (US); Stephan Bushong, Decatur, IL (US); Howard Roy Franklin, Decatur, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/846,633

(22) Filed: May 17, 2004

(51) Int. Cl.[7] .............................................. B62D 33/02
(52) U.S. Cl. .................. 296/183.2; 296/183.1
(58) Field of Search ..................... 296/183.1, 183.2, 296/184.1

(56) References Cited

U.S. PATENT DOCUMENTS

| | | | |
|---|---|---|---|
| 2,540,400 A * | 2/1951 | McHenry ................. | 296/184.1 |
| 3,389,451 A * | 6/1968 | Speca et al. ............. | 29/897.15 |
| 3,897,972 A | 8/1975 | Logue | |
| 4,230,254 A | 10/1980 | Proeschl | |
| 5,417,453 A * | 5/1995 | VanDenberg ............ | 296/184.1 |
| 5,662,374 A | 9/1997 | Wheeler | |
| 5,803,531 A * | 9/1998 | Nielsen ................... | 296/183.2 |
| 6,003,812 A | 12/1999 | Micale et al. | |
| 6,129,409 A * | 10/2000 | D'Amico ................. | 296/183.2 |
| 6,305,731 B1 * | 10/2001 | Hook et al. ............. | 296/183.2 |
| 6,520,590 B2 * | 2/2003 | Feuereisen Azocar ... | 296/183.2 |
| 2002/0180240 A1 | 12/2002 | Fujan et al. | |
| 2003/0161710 A1 | 8/2003 | Musso, Jr. et al. | |

\* cited by examiner

*Primary Examiner*—Jason Morrow
(74) *Attorney, Agent, or Firm*—Finnegan, Henderson, Farabow, Garrett & Dunner

(57) ABSTRACT

A reinforced payload container may include a panel forming at least one of a floor, a sidewall, and a front wall. A first plurality of ribs may be attached to the panel and may include a first free edge and a first panel edge. A second plurality of ribs may also be attached to the panel and may intersect with the first plurality of ribs. The second plurality of ribs may include a second free edge and a second panel edge. The first plurality of ribs may include first rib slots along the first free edge, and the second plurality of ribs may include second rib slots along the second panel edge. The first rib slots and the second rib slots may be aligned so that the first rib slots receive the second ribs and the second rib slots receive the first ribs.

30 Claims, 5 Drawing Sheets

REINFORCED PAYLOAD CONTAINER

TECHNICAL FIELD

This disclosure is directed to a payload container and, more particularly, to a support structure for the payload container.

BACKGROUND

The amount of a payload that may be hauled in an off-highway truck is often limited by the requirement that the combined weight of the payload and truck not exceed an established maximum gross vehicular weight (GVW). The maximum GVW is a limit established based on such things as the power-train and the weight that can be carried by tires. Because off-highway trucks are manufactured from metals in order to be durable and robust, the trucks also are heavy. Any reduction in the truck's weight allows an operator to increase the payload weight by the same amount without exceeding the maximum GVW. To the operator, any increase in payload translates to an increase in productivity, resulting in higher profits. Further, a reduction of the weight of the truck lowers operating costs by reducing fuel consumption when the truck is not loaded and returning to the worksite.

In order to maximize the productivity of off-highway trucks, it is desirable to minimize a truck's weight in order to maximize the weight of a payload that may be safely carried or transported by the truck. One method for reducing the weight of an off-highway truck is to reduce the thickness of metal components to the minimum amount that will adequately perform the required functionality of the truck. For example, a payload container on an off-highway truck may be manufactured using metal plates with the minimum thickness required to support a payload. However, as the amount of metal utilized in the off-highway truck is decreased, the durability and life of the truck may be negatively affected. For example, the use of thin metal in a payload container can cause the metal to sag or to wear out quickly. Accordingly, there is an undesirable chance of deformation of the metal.

In order to preserve the strength and operability of a payload container formed of metal plates, supports may be provided on those plates. One example of such supporting structure is shown in U.S. Pat. No. 4,230,254 to Proeschl. The '254 patent discloses a modular truck body for a dump-truck. L-shaped ribs are secured to the undersides of the bottom and side sections of the modular truck body. In addition, two longitudinally extending and laterally spaced beams support the underside of the bottom section. Although the longitudinal beams and L-shaped ribs provide support for the truck body, the supports may still be improved upon to properly support a payload container having thin walls, while allowing the total weight of the supporting ribs and the truck body to be minimized.

The present disclosure is directed toward overcoming one or more of the deficiencies in the prior art.

SUMMARY OF THE INVENTION

One aspect of the present disclosure is directed to a reinforced payload container. The payload container may include a panel forming at least one of a floor, a sidewall, and a front wall. A first plurality of ribs may be attached to the panel, and may include a first free edge and a first panel edge. A second plurality of ribs may also be attached to the panel and may intersect with the first plurality of ribs. The second plurality of ribs may include a second free edge and a second panel edge. The first plurality of ribs may include first rib slots along the first free edge, and the second plurality of ribs may include second rib slots along the second panel edge. The first rib slots and the second rib slots may be aligned so that the first rib slots receive the second ribs and the second rib slots receive the first ribs.

In another aspect, the present disclosure is directed to a reinforced payload container having a panel forming at least one of a floor, a sidewall, and a front wall. A first plurality of ribs may have a first free edge and a first panel edge, and may be attached to the panel. A second plurality of ribs may have a second free edge and a second panel edge, and also may be attached the panel, with the second plurality of ribs intersecting with the first plurality of ribs. At least one of the first and second plurality of ribs may include a wave along at least one of the first and second free edges.

In yet another aspect, the present disclosure is directed to a method for reinforcing a panel for a payload container. The method includes placing a first rib on a panel, with the first rib having a first free edge and a first panel edge. A slot may be formed in the first free edge. A second rib may also be placed on the panel. The second rib may have a second free edge and a second panel edge. A second slot may be formed in the second panel edge. The first slot of the first rib may be aligned with the second slot of the second rib, such that the first slot receives the second rib and the second slot receives the first rib, thereby forming an intersection. The first and second ribs may then be secured to the panel to reinforce the panel.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
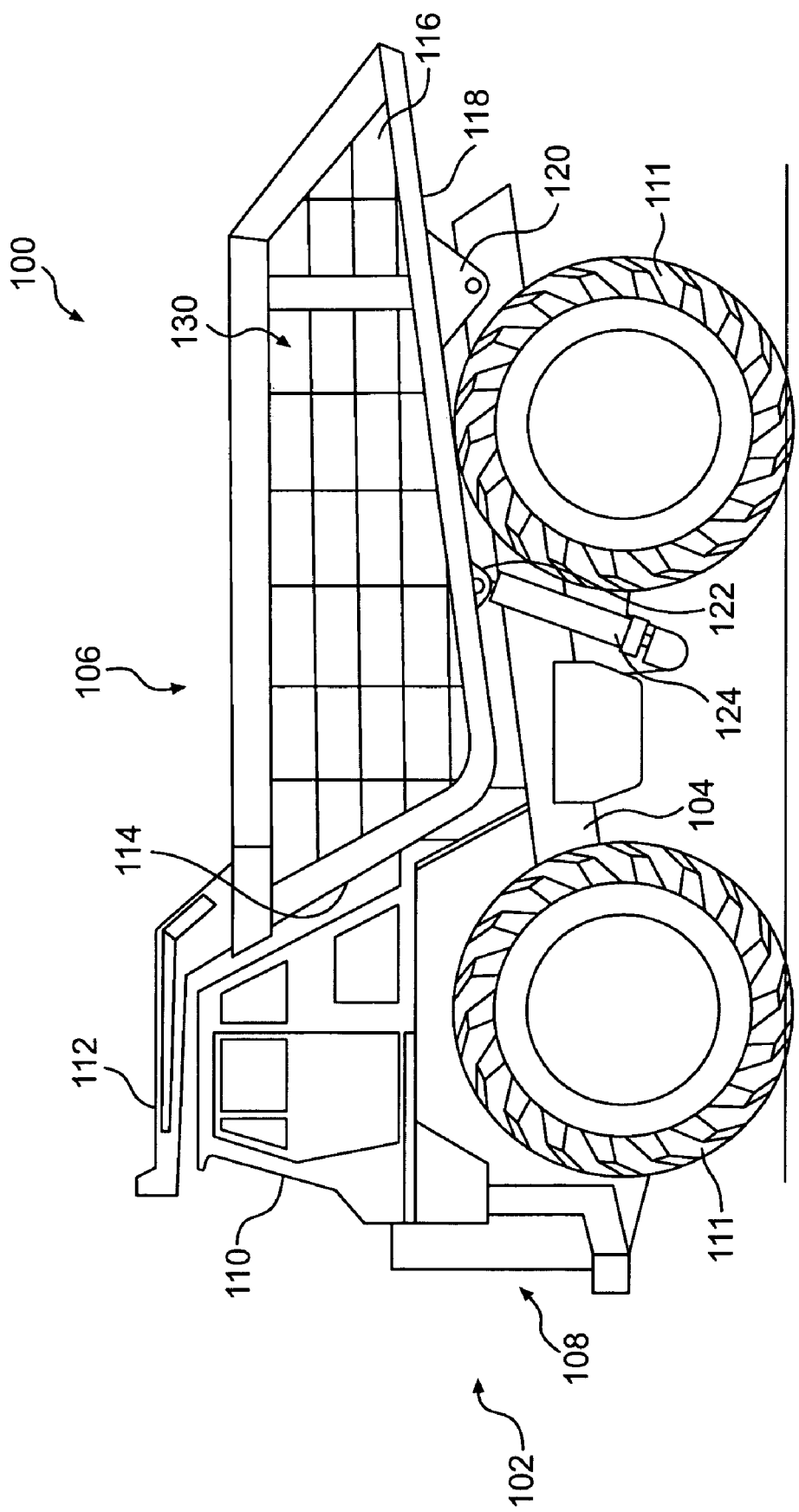
FIG. 1 is a pictorial representation of an off-highway truck with a payload container.

An exemplary embodiment of a work machine 100 is illustrated in FIG. 1. The work machine 100 may be an off-highway truck, as shown, or other vehicle, such as an articulated truck, an off-highway tractor, or other work-machine. The exemplary work machine 100 may include a front end 102, a frame 104, and a payload container 106. The front end 102 may include an engine compartment 108 and an operator's cab 110. The engine compartment 108 may house an engine, a transmission, and/or other components used to power the work machine 100. The operator's cab 110 may include controls for operating and driving the work machine 100. The engine in the engine compartment 108 drives wheels 111 attached to the frame 104, in a manner known in the art.

The payload container 106 is attached to and supported by the frame 104. The payload container 106 may include a number of panels that form a canopy 112, a front wall 114, sidewalls 116, and a floor 118 (see FIG. 2). It should be understood, however, that the payload container 106 may vary from the exemplary payload container of FIG. 1. For example, other exemplary payload containers do not include a canopy, while others have sidewalls that converge together obviating the need for a floor. Other exemplary payload containers would be apparent to one skilled in the art.

The canopy 112 may extend from the front wall 114 over the operator's cab 110. The canopy 112 may be configured to provide protection to the operator's cab 110 from earth, debris, and other material that may be dumped into the payload container 106, including on the canopy 112 itself.

The front wall 114 of the payload container 106 may be located behind the operator's cab 110 and may be configured to support the weight of a load within the payload container 106. Side walls 116 (only one of which is shown) may extend rearward from the front wall 114. These side walls 116 may connect to the floor 118, along with the front wall 114, to form a box-like structure for receiving and carrying a payload. A tailgate (not shown) may be provided at the rear of the payload container 106 to prevent a load from spilling during transport.

The payload container 106 may be connected to the frame 104 by a pivoting body support 120. The body support 120 may be located toward the rear end of the payload container 106. Cylinder brackets 122 may be provided on the underside of the payload container 106 and may be positioned toward the front end of the payload container 106. An actuator 124, such as a hydraulic cylinder, may extend between the frame 104 and the cylinder brackets 122 and may be actuated to raise a front end of the payload container 106 to dump a payload.

The payload container 106 may include an interlacing grid support structure 130 on any of the panels that form the canopy 112, the front wall 114, the side walls 116, or the floor 118. Shown on the sidewall 116 in FIG. 1, the interlacing grid support structure 130 may be formed of a number of intersecting ribs. These are described in greater detail with reference to FIG. 2.

Figure 2:
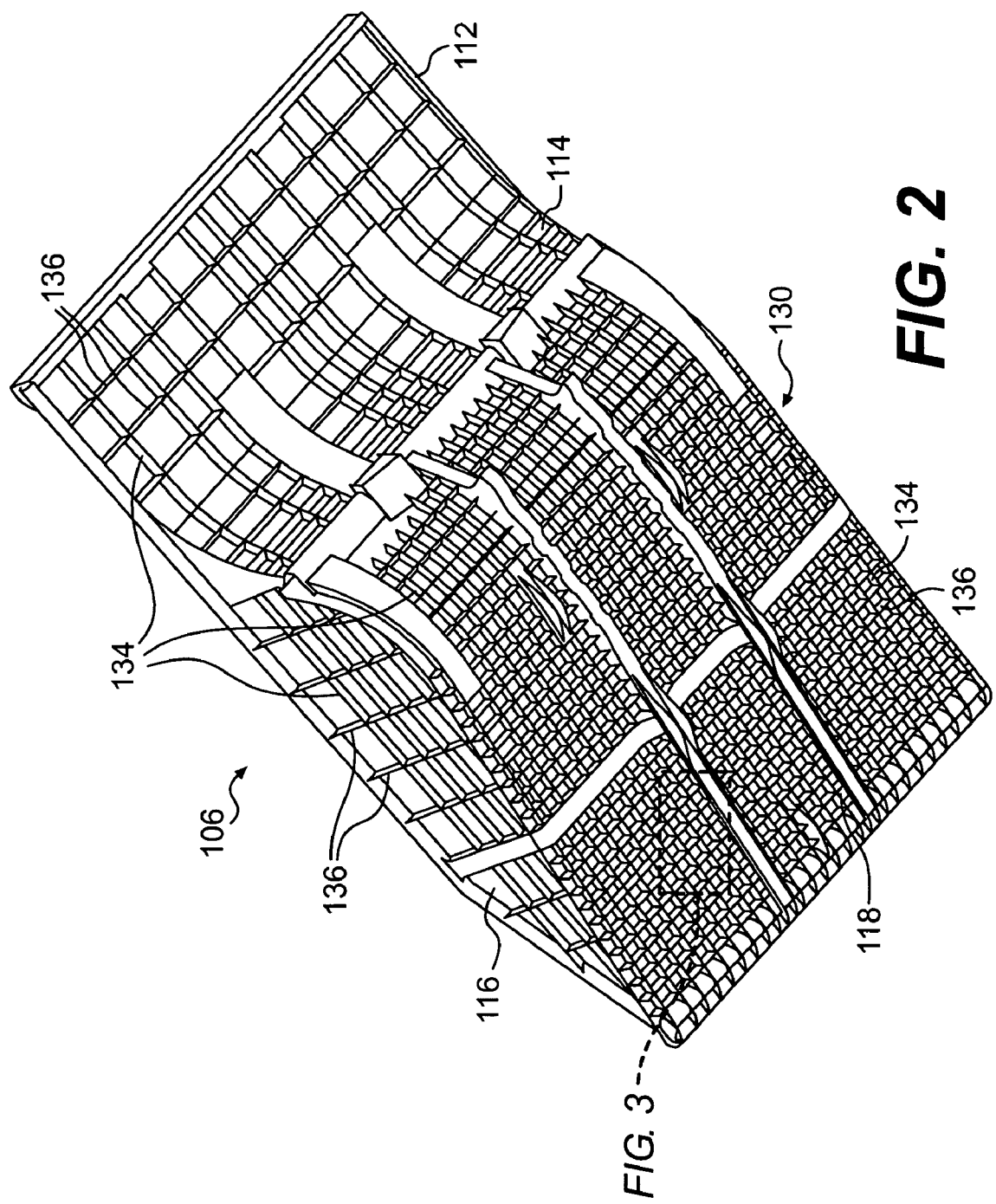
FIG. 2 is a pictorial representation of an isometric bottom view of the payload container of the off-highway truck of FIG. 1.

FIG. 2 shows a bottom isometric view of the payload container 106. With reference to FIG. 2, the interlacing grid support structure 130 may be provided on any or all of the panels forming the canopy 112, the front wall 114, the side walls 116, and the floor 118. Although the interlacing grid support structure 130 is shown on the exterior surfaces of the payload container 106, it could instead, or in addition to, be formed on the surfaces inside the payload container 106. The interlacing grid support structure 130 may include longitudinal ribs 134 and lateral ribs 136. As used in this description, the longitudinal ribs 134 are ribs that extend substantially in a direction from the front of the payload container 106 to the back of the container. The lateral ribs 136 are ribs that extend from one side of the container to the other side. In addition, for purposes of this description, vertical ribs on the sidewalls 116 that intersect the longitudinal ribs 134 are referred to herein as lateral ribs 136.

The longitudinal ribs 134 may extend along the floor 118, up the front wall 114 and along the canopy 112. As shown in FIG. 2, the longitudinal ribs 134 may also extend along any portion thereof, and need not extend from one end of the payload container 106 to the other. Likewise, they may extend longitudinally completely or partially along the side walls 116. The lateral ribs 136 may extend from one side of the payload container to the other, intersecting the longitudinal ribs 134 along the canopy 112, the front wall 114, and the floor 118.

The longitudinal and lateral ribs 134, 136 may be securely attached to the underlying panels through any known means. In one exemplary embodiment, the ribs 134, 136 are welded directly to the panels. The ribs provide support to the panels, thereby strengthening the panels and enabling thinner panels to carry additional weight without increased deformation. In one exemplary embodiment, the ribs are not attached to the panels, but are positioned to support the panels.

In the exemplary embodiment shown, the longitudinal and lateral ribs 134, 136 are generally positioned at right angles from each other. However, the ribs 134, 136 could be positioned at angles other than right angles from each other. Further, instead of extending in a longitudinal and lateral direction, the ribs 134, 136 could be angled to extend between opposing corners of the payload container 106.

Spacing between individual, adjacent longitudinal ribs 134 and individual, adjacent lateral ribs 136 may be set to properly support predicted loads on a panel of the payload container 106. Because forces against the canopy 112, the front wall 114, and the sidewalls 116 are generally less than forces against the floor 118, the spacing between adjacent ribs on the canopy 112, the front wall 114, and the sidewalls 116 may differ from that of the floor 118 or from each other. In the exemplary embodiment shown, spacing between adjacent longitudinal ribs 134 and the spacing between adjacent lateral ribs 136 on the floor 118 are set substantially equal. Accordingly, the area between the ribs 134, 136 creates a generally square box. However, on the sidewalls 116, spacing between adjacent longitudinal ribs 134 is different than the spacing between adjacent lateral ribs 136. Accordingly, in the exemplary embodiment shown, the area between the ribs 134, 136 on the sidewalls 116 creates a generally rectangular box. In addition, the spacing of ribs 134, 136 on the panels may vary from panel to panel. For example, in the exemplary embodiment shown, the lateral ribs 136 on the sidewalls 116 are spaced with one lateral rib 136 for every three lateral ribs 136 on the floor 118.

Figure 3:
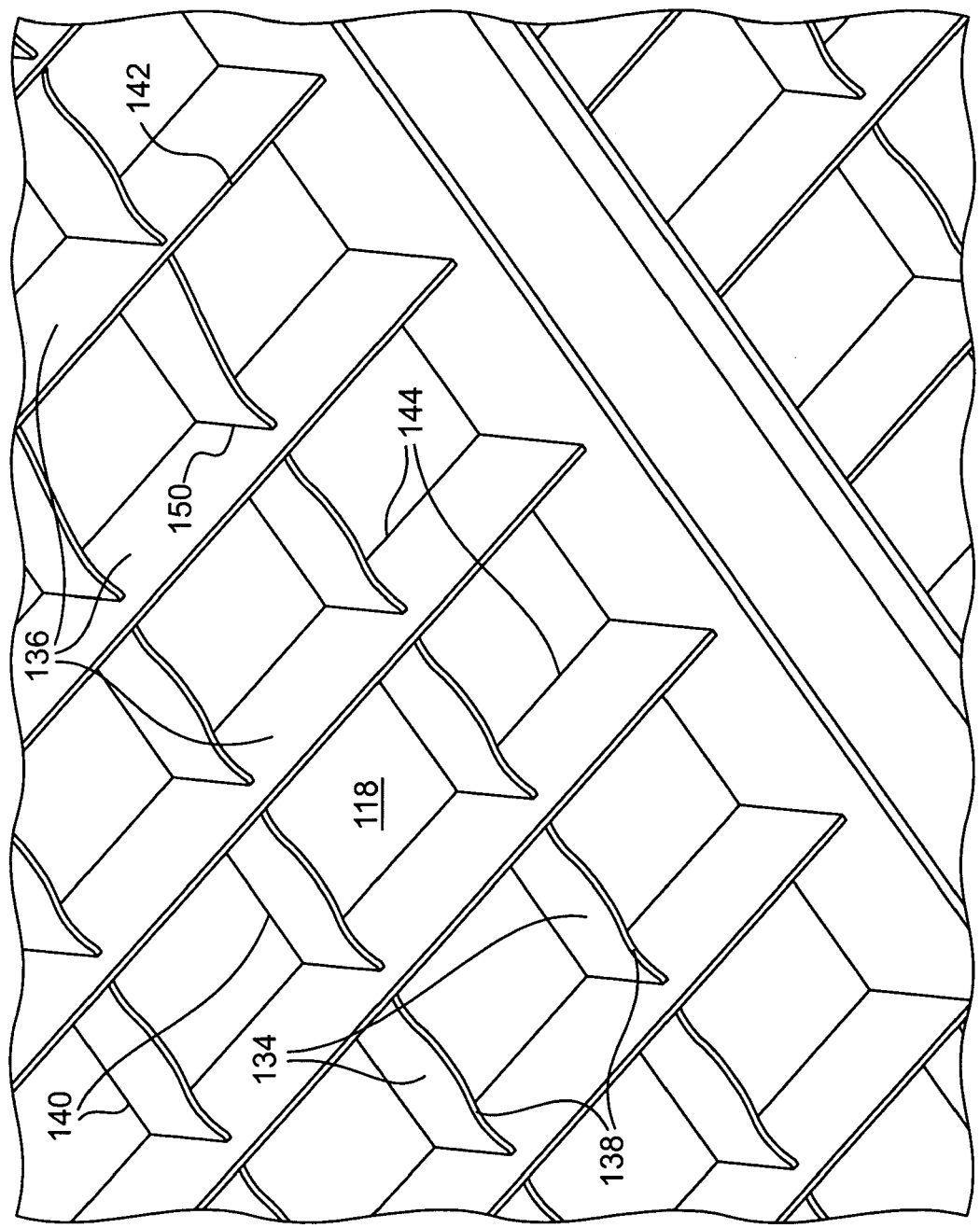
FIG. 3 is an enlarged pictorial representation of a portion of the payload container of FIG. 2.

The ribs are described in greater detail with reference to FIGS. 3 and 4. FIG. 3 is an enlargement of the box labeled FIG. 3 shown in FIG. 2, and FIG. 4 shows a single intersection between a longitudinal rib 134 and a lateral rib 136 during or prior to assembly.

Figure 4:
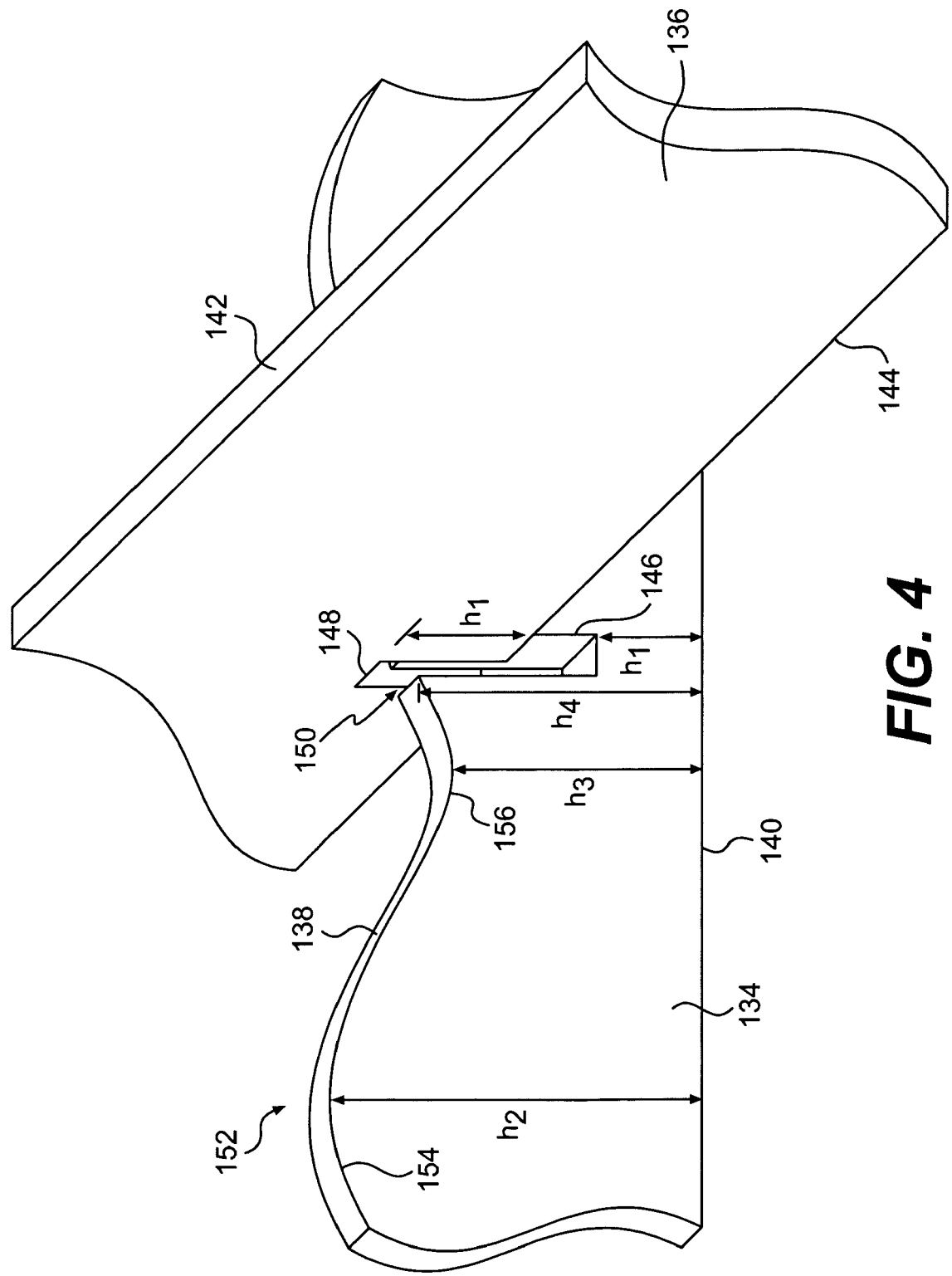
FIG. 4 is a pictorial representation of a longitudinal and a lateral support rib for a payload container.

Referring to FIGS. 3 and 4, each longitudinal rib 134 includes a free edge 138 and a panel edge 140. The panel edge 140 is an edge that is configured to attach to a panel of the payload container 106. For example, the panel edge 140 of each longitudinal rib 134 may be attached to the canopy 112, the front wall 114, the side walls 116, or the floor 118. The free edge 138 is not directly connected to any panel of the payload container 106. Similarly, each lateral rib 136 includes a free edge 142 and a panel edge 144. The panel edge 144 may be configured to connect to a panel of the payload container 106. The panel edges 140, 144 may be attached to any panel of the payload container 106 by welding or other attachment methods.

In one exemplary embodiment, the ribs 134, 136 may be formed of the same type of material as the panels of the payload container 106. For example, in one exemplary embodiment, the floor 118 and both the longitudinal ribs 134 and the lateral ribs 136 are formed of AR400 steel. Naturally, the material of the ribs 134, 136 may be selected and sized in order to bear the expected loads to be applied against the panels of the payload container 106.

Like the material, the thickness of the ribs 134, 136 may be selected to provide sufficient support to a panel of the payload container 106. In one exemplary embodiment, the thickness of the ribs 134, 136 is eight millimeters. Likewise, in this exemplary embodiment, the panels of the payload container 106 may also be eight millimeters thick. However, like the thickness of the ribs 134, 136, the panels of the payload container 106 could be set at any other thickness, and need not correspond to the thickness of the ribs 134, 136. Further, the thickness of the longitudinal ribs 134 need not be the same as the thickness of the lateral ribs 136.

Referring to FIG. 4, the longitudinal rib 134 may include a slot 146 formed in the free edge 138 that may extend generally in the direction of the panel edge 140. Likewise, the lateral rib 136 may also include a slot 148 extending generally from the panel edge 144 toward the free edge 142. The longitudinal rib slot 146 and the lateral rib slot 148 may be configured to respectively receive the lateral rib 136 and the longitudinal rib 134 to interconnect and form an intersection 150 when assembled. In one exemplary embodiment, the longitudinal rib 134 at the slot 146 may have a height $h_1$. In order to minimize any gap within the intersection 150 when the ribs 134, 136 are assembled, the height of the lateral rib slot 148 may also be at or around the height $h_1$. In one exemplary embodiment, the height $h_1$ of the longitudinal rib 134 at the longitudinal rib slot 146 is about half the distance between the free edge 138 and the panel edge 140.

The width of the slots 146, 148 may be sized to correspond to the width of the rib to be received in the slot. However, the slots 146, 148 could have other heights or widths as desired. The ribs 134, 136 may be permanently attached to each other, such as by welding, along the slots 146, 148 at the intersection 150 thereby creating a solid joint. It should be noted that although the ribs 134,136 are described with the longitudinal rib 134 having a slot 146 in the free edge 138 and the lateral rib 136 having a slot 148 in the panel edge 144, the longitudinal rib slot 146 could be formed in either the free or panel edges 138, 140 and the lateral rib slot 148 could be formed in either the free or panel edges 142, 144.

As best seen in FIG. 4, the free edge 138 of the longitudinal ribs 134 is formed as a wave 152. The wave 152 includes peaks 154 and valleys 156 along the longitudinal ribs 134. The peaks 154 have a height $h_2$ and the valleys 156 have a height $h_3$, where the height $h_2$ is greater than the height $h_3$. The longitudinal rib 134 has an intersection height $h_4$ at the intersection 150. The intersection height $h_4$ may be selected to ensure a secure connection between the longitudinal and lateral ribs 134, 136. In the exemplary embodiment shown, the intersection height $h_4$ is less than the height $h_2$ and greater than the height $h_3$. However, the intersection height $h_4$ could be any desired height, including, for example, the height $h_3$ at the valley 156 and the height $h_2$ at the peak 154. In the exemplary embodiment shown, the peaks 154 may be formed so that the peaks 154 are equally distanced from the nearest intersection 150 with the lateral ribs 136. In another exemplary embodiment, the valleys 154 may be at the intersection 150.

Figure 5:
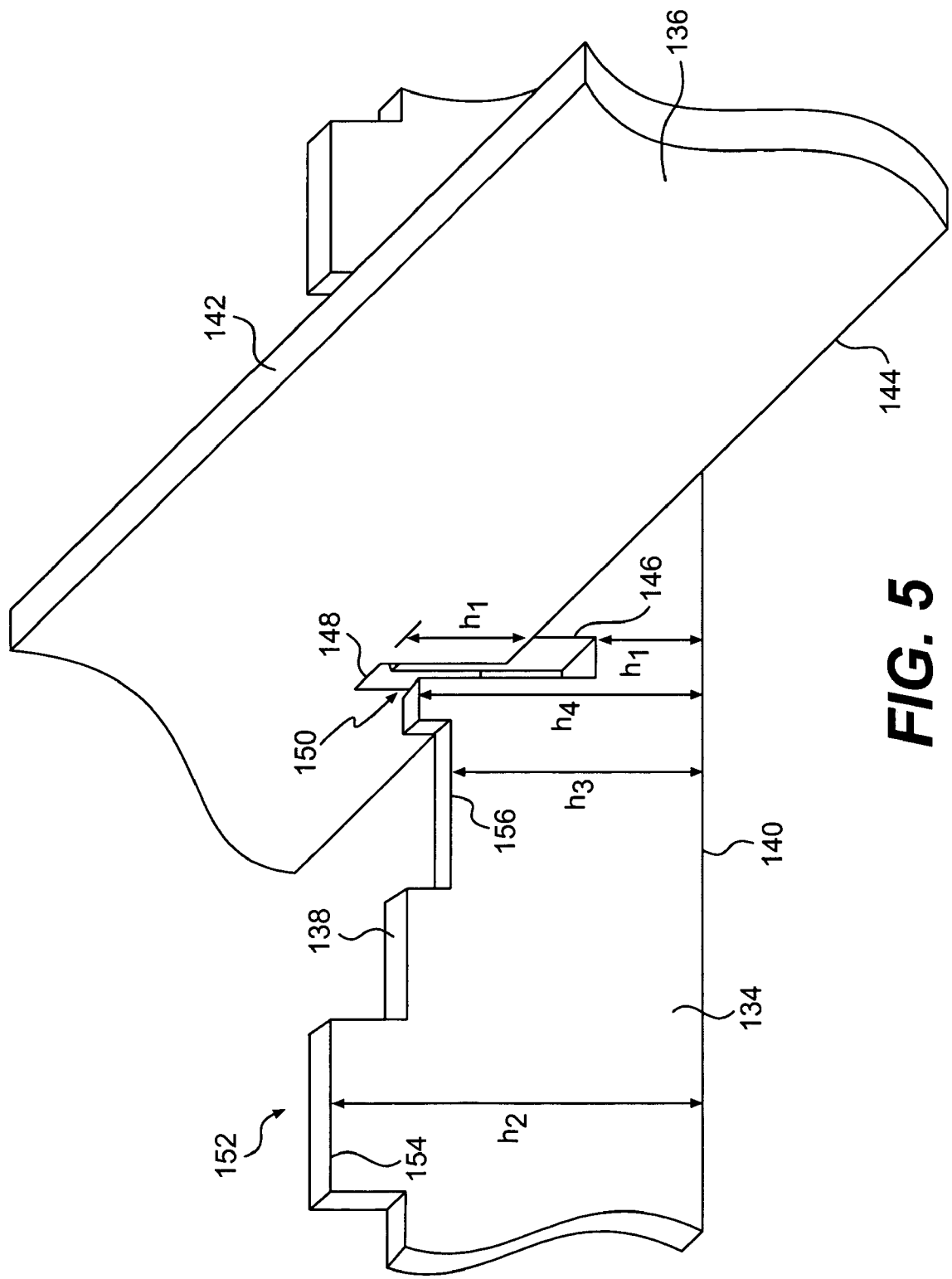
FIG. 5 is a pictorial representation of an alternative longitudinal and a lateral support rib for a payload container.

In the exemplary embodiment shown, the lateral rib 136 has a maximum height greater than the maximum height of the longitudinal rib 134. For example, the lateral rib 136 may have a height of about 180 millimeters, while the longitudinal rib 134 has a maximum height of about 150 millimeters at the peak 154. It should be noted that in other exemplary embodiments, the height of the longitudinal rib 134 may be equal to or greater than the height of the lateral rib 136. Further, the lateral ribs 136 may include waves in addition to or instead of the longitudinal ribs 134. In one exemplary embodiment, the ribs on the floor 118 include the wave 152 and the ribs on the sidewalls 116 do not. Further, although the wave 152 is a smooth curve in the exemplary embodiment shown, the wave 152 could also be formed of a single step or a series of steps formed of adjacent planar portions of the free edge 138 with an overall ascending or descending height. One exemplary stepped curve is shown in FIG. 5. Other configurations could also be used to form the wave.

In one exemplary embodiment where one or both of the longitudinal and lateral ribs include the wave, one of the longitudinal or lateral ribs may not include a slot, and the ribs may not intermesh. Instead, one of the longitudinal or lateral ribs may be formed of separate pieces extending between the other ribs. For example, the lateral rib may be formed of separate short ribs, each connected to, and extending between adjacent lateral ribs.

In the exemplary embodiment shown, the longitudinal ribs and lateral ribs 134, 136 are formed of plates of uniform width. However, as would be apparent to one skilled in the art, the ribs may be formed of materials having other configurations, such as an I-beam configuration or a T-beam configuration. I-beams and T-beams may be more expensive than plates. By increasing the height of the plate ribs, the plates may be able to withstand the same forces as the more expensive configurations.

INDUSTRIAL APPLICABILITY

The interlacing grid support structure 130 may be used to reinforce a panel, such as the canopy 112, the front wall 114, the sidewalls 116, and the floor 118, using any number of methods. In one exemplary method, the panels are reinforced with the interlacing grid support structure 130 before being assembled into the payload container 106. One exemplary method for reinforcing the floor 118 is described below.

In this exemplary method, a panel sized to become the floor panel 118 may be placed flat on a surface, such as the ground. The longitudinal ribs 134, having slots in the free edge 138, may be placed on the floor panel 118 in rows. The lateral ribs 136, having slots in the panel edge 144, may be placed over the rows of the longitudinal ribs 134 so that they are generally perpendicular to the rows of the longitudinal ribs 134. Each longitudinal rib slot 146 in the free edge 138 of the longitudinal rib 134 may be aligned with a lateral rib slot 148 in the panel edge 144 of the lateral rib 136.

The ribs are then interlaced by fitting the slots 146, 148 together to form the intersections 150, with the lateral ribs 136 being fit into the longitudinal rib slots 146 and with the longitudinal ribs 134 being fit into the lateral rib slots 148. This forms the interlacing grid support structure 130. When the ribs are interlaced, the structure may be permanently attached to the floor panel 118, such as by welding, to reinforce the floor panel 118. To strengthen the connection of the ribs at the intersection 150, the ribs 134, 136 may optionally be permanently attached to each other at the intersections 150, such as by welding. The canopy 112, the front wall 114, and/or the sidewalls 116 may be similarly reinforced.

When the desired reinforcement is applied to each panel, the panels may be assembled into a payload container 106 using methods known in the art. It should be noted that the panels may be reinforced as desired based on expected stress the panels will incur. In one exemplary embodiment, only the floor 118 is reinforced. In another exemplary embodiment, only the sidewalls 116 are reinforced. Any panel may be or may not be reinforced as desired.

When the payload container 106 is carrying a payload, force is applied by the weight of a payload through the panels (i.e., the canopy 112, the front wall 114, the sidewalls 116, or the floor 118) to the longitudinal and lateral ribs 134, 136. When these forces are applied, the free edges 138, 142 of the longitudinal and lateral ribs 134, 136 are placed in tension. These edges are not directly attached to any panel of the payload container 106, and are distanced from the panels by the height of the ribs 134, 136. In contrast, the panel edges 140, 144 are positioned directly against, or flush with the panels. Accordingly, the stresses at the free edges 138, 142 of the ribs 134, 136 may be high compared to the stresses at the panel edges 140, 144.

As described above, the lateral ribs 136 may have no slots along the free edge 142. This enables the lateral ribs 136 to be able to withstand high levels of stress without deformation. The longitudinal ribs 134 may include slots formed through the free edges 138, extending partially through the ribs 134 toward to the panel edges 140 at the intersections 150. Because the slots 146 in the free edges 138 of the longitudinal ribs 134 are located at the intersections 150, the slots do not unduly weaken the support structure because the intersection 150 is supported by both the longitudinal ribs 134 and the lateral ribs 136.

Further, because the intersection 150 supports the panel with both the longitudinal and lateral ribs 134, 136, the applied stresses along the free edges 138, 142 of the of the ribs 134, 136 are higher in the lengths of ribs 134, 136 between intersections 150 than at the intersections 150. Thus, the highest stress may be located along the free edges 138, 142 at the distances furthest from the intersections 150. The waves 152 along the free edge 138 of the longitudinal ribs 134 compensate for increased stress in the area between intersections by having a greater height in the areas of higher stress, such as by having a height $h_2$ at the peak 154. As the distance to the intersections 150 decreases, the stress likewise decreases. Accordingly, the height of the longitudinal ribs 134 at the point of lower stresses may be reduced, such as the height $h_3$ at the valley 156, while still providing sufficient support for the panels. In other words, the height of the longitudinal rib 134 may correspond to the amount of expected applied stress. By providing a longitudinal rib 134 with a height that corresponds to the amount of expected stress, any excess material in the longitudinal ribs 134 may be removed to minimize the weight of the interlacing grid support structure 130. It should be noted that in the exemplary embodiment shown, the height of the longitudinal rib increases from the valley height $h_3$ to the intersection height $h_4$. This is an optional increase in height allowing easy formation of the slot 146 and providing more surface area for the longitudinal rib 134 to be attached to the lateral rib 136, such as by welding.

The interlacing grid support structure 130 may be used to support thin panels of a payload container 106 in a manner that enables the overall weight of the payload container 106 to be decreased, while at the same time providing sufficient support to carry a payload. Decreasing the overall weight of a work machine, such as, for example, by decreasing the weight of the payload container 106 by using thin panels and the interlacing grid support structure 130, enables an operator to carry larger payloads without exceeding the maximum GVW, thereby making mining or excavating more productive and making operation of the work machine more efficient. Additionally, the weight reduction makes the truck more fuel efficient anytime it is not loaded to its maximum GVW. Accordingly, the operational lifetime of the truck may be increased.

Although the embodiment being described is a payload container for a dumping work machine 100, the support structure could be used to support any panel in any container-type application. For example, the support structure may be used on bucket devices, articulated trucks, paving equipment, off-highway tractors, and other equipment that includes some sort of container that may have loads applied against it.

It will be apparent to those skilled in the art that various modifications and variations can be made to the disclosed embodiments without departing from the scope of this disclosure. Other embodiments will be apparent to those skilled in the art from consideration of the specification and practice of the invention disclosed herein. It is intended that the specification and examples be considered as exemplary only, with a true scope of the disclosure being indicated by the following claims and their equivalents.

What is claimed is:

1. A reinforced payload container for a vehicle having a maximum gross vehicular weight (GVW), comprising:
    a panel forming at least one of a floor, a sidewall, and a front wall;
    a first plurality of ribs attached to the panel, the first plurality of ribs including a first free edge and a first panel edge; and
    a second plurality of ribs attached to the panel and intersecting with the first plurality of ribs, the second plurality of ribs including a second free edge and a second panel edge,
    wherein the first plurality of ribs include first rib slots along the first free edge, and the second plurality of ribs include second rib slots along the second panel edge,
    and wherein the first rib slots and the second rib slots are aligned so that the first rib slots receive the second ribs and the second rib slots receive the first ribs,
    and wherein the panel and the ribs together are configured to carry the weight of a payload that increases a vehicle weight to the maximum GVW.

2. The reinforced payload container of claim 1, wherein the first and second plurality of ribs are formed of a flat plate and are attached to the panel along their respective panel edge.

3. The reinforced payload container of claim 1, wherein the payload container has a front end and a rear end, and the first plurality of ribs extends longitudinally along the panel between the front and rear ends of the payload container, and wherein the second plurality of ribs extends along the panel between a first side and a second side of the payload container.

4. The reinforced payload container of claim 1, wherein the first and second plurality of ribs are formed of AR400 steel.

5. The reinforced payload container of claim 1, wherein the second plurality of ribs have a height greater than the first plurality of ribs.

6. The reinforced payload container of claim 1, wherein a height of at least one of the first and second plurality of ribs varies along its length.

7. The reinforced payload container of claim 6, wherein the varying height of said at least one first and second plurality of ribs increases as the distance increases from an intersection of the first and second plurality of ribs.

8. The reinforced payload container of claim 1, wherein the first and second plurality of ribs are in the shape of one of an I-beam, a T-beam, and a flat plate.

9. A reinforced payload container, comprising:
a panel forming at least one of a floor, a sidewall, and a front wall;
a first plurality of ribs having a first free edge and a first panel edge, the first panel edge being attached to the panel; and
a second plurality of ribs having a second free edge and a second panel edge, the second panel edge being attached the panel, the second plurality of ribs intersecting with the first plurality of ribs,
wherein at least one of the first and second plurality of ribs includes a wave along at least one of the first and second free edges.

10. The reinforced payload container of claim 9, wherein the wave includes a peak height in a location along the rib that corresponds to a location of highest stress from a payload in the payload container.

11. The reinforced payload container of claim 10, wherein the peak height of the wave is located at a center point between two adjacent intersections.

12. The reinforced payload container of claim 9, wherein the wave includes a valley between the peak height and an intersection between the first and second plurality of ribs.

13. The reinforced payload container of claim 9, wherein the wave is stepped.

14. The reinforced payload container of claim 9, wherein the wave is formed by one of a smooth curve and adjacent steps having increasing or decreasing heights.

15. The reinforced payload container of claim 9, wherein the first plurality of ribs include first rib slots along the first free edge, and the second plurality of ribs include second rib slots along the second panel edge,
and wherein the first rib slots and the second rib slots are aligned so that the first rib slots receive the second ribs and the second rib slots receive the first ribs.

16. The reinforced payload container of claim 9, wherein the first plurality of ribs is formed of ribs spanning the distance between adjacent ribs of the second plurality of ribs.

17. A work machine having a maximum gross vehicular weight (GVW), comprising:
a frame;
a payload container including
a floor panel attached to the frame; and
a support structure attached to the floor panel, the support structure including
a first plurality of ribs having a first free edge and a first panel edge, the first panel edge being attached to the floor panel; and
a second plurality of ribs having a second free edge and a second panel edge, the second panel edge being attached to the floor panel, the second plurality of ribs intersecting the first plurality of ribs, wherein the first plurality of ribs include first rib slots along the first free edge, and the second plurality of ribs include second rib slots along the second-panel edge, and
wherein the first rib slots and the second rib slots are aligned so that the first rib slots receive the second ribs and the second rib slots receive the first ribs,
and wherein the panel and the ribs together are configured to carry the weight of a payload that increases a work machine weight to the maximum GVW.

18. The work machine of claim 17, wherein the payload container includes:
sidewalls at opposing sides of the floor panel; and
a sidewall support structure attached to each of the sidewalls, the sidewall support structure including
a first plurality of ribs having a first free edge and a first panel edge, the first panel edge being attached to the sidewall; and
a second plurality of ribs having a second free edge and a second panel edge, the second panel edge being attached the sidewall, the second plurality of ribs intersecting the first plurality of ribs, wherein the first plurality of ribs include first rib slots along the first free edge, and the second plurality of ribs include second rib slots along the second panel edge, and
wherein the first rib slots and the second rib slots are aligned so that the first rib slots receive the second ribs and the second rib slots receive the first ribs.

19. The work machine of claim 17, wherein the second plurality of ribs have a height greater than the first plurality of ribs.

20. The work machine of claim 17, wherein a height of at least one of the first and second plurality of ribs varies along its length.

21. The work machine of claim 20, wherein the varying height includes a minimum height, and wherein the minimum height occurs at intersections of the first and second plurality of ribs.

22. A method for reinforcing a panel for a payload container comprising:
placing a first rib on a panel, the first rib having a first free edge and a first panel edge, the first free edge having a first slot formed therein;
placing a second rib on the panel, the second rib having a second free edge and a second panel edge, the second panel edge having a second slot formed therein, wherein at least one of the first and second ribs includes a wave forming peaks and valleys along at least one of the first and second free edges;
aligning the first slot of the first rib with the second slot of the second rib, such that the first slot receives the second rib and the second slot receives the first rib, thereby forming an intersection;
securing the first rib to the panel to reinforce the panel; and
securing the second rib to the panel to reinforce the panel.

23. The method of claim 22, including permanently joining the first rib to the second rib at the intersection.

24. The method of claim 22, including attaching the reinforced panel to additional panels to form the payload container.

25. The method of claim 22, wherein placing a first rib includes placing a plurality of the first ribs on the panel, and
wherein placing a second rib includes placing a plurality of the second ribs on the panel, the plurality of first and second ribs forming a grid of interconnecting first and second ribs; and
securing the grid to the panel to reinforce the panel.

26. The reinforced payload container of claim 1, wherein at least one of the first and second plurality of ribs includes a wave along at least one of the first and second free edges.

27. The reinforced payload container of claim 26, wherein the wave varies along its length in a manner to have a peak height in a location along the rib that substantially corre sponds to a location of highest stress from a payload in the payload container.

28. The reinforced payload container of claim 1, wherein the reinforced payload container includes a floor, first and second sidewalls at opposite sides of the floor, and a front wall adjacent the first and second sidewalls.

29. The work machine of claim 20, wherein the varying height includes a minimum height, and wherein the minimum height occurs adjacent to intersections of the first and second plurality of ribs.

30. The work machine of claim 20, wherein payload container includes sidewalls at opposing sides of the floor panel and is configured to be carried on the work machine.

* * * * *